US012582033B2

(12) United States Patent
Wegmann et al.

(10) Patent No.: US 12,582,033 B2
(45) Date of Patent: Mar. 24, 2026

(54) SYSTEMS AND METHODS FOR AUTOMATED GRAIN CART UNLOADING

(71) Applicant: DEERE & COMPANY, Moline, IL (US)

(72) Inventors: Riley J. Wegmann, Urbana, IA (US); William J. Vande Haar, Janesville, IA (US)

(73) Assignee: Deere & Company, Moline, IL (US)

( * ) Notice: Subject to any disclaimer, the term of this patent is extended or adjusted under 35 U.S.C. 154(b) by 82 days.

(21) Appl. No.: 18/593,375

(22) Filed: Mar. 1, 2024

(65) Prior Publication Data

US 2024/0341226 A1      Oct. 17, 2024

Related U.S. Application Data

(60) Provisional application No. 63/495,912, filed on Apr. 13, 2023.

(51) Int. Cl.
A01D 41/12      (2006.01)
A01D 41/127     (2006.01)
(Continued)

(52) U.S. Cl.
CPC ..... A01D 41/1217 (2013.01); A01D 41/1274 (2013.01); B65G 67/26 (2013.01); B65G 65/463 (2013.01); B65G 67/24 (2013.01)

(58) Field of Classification Search
CPC ............ A01D 41/1217; A01D 41/1274; B65G 67/26; B65G 65/463; B65G 67/24
(Continued)

(56) References Cited

U.S. PATENT DOCUMENTS 5,938,714 A       8/1999  Satonaka
6,006,144 A      12/1999  Takahashi et al.
(Continued)

FOREIGN PATENT DOCUMENTS

CA        2791436 A1     4/2014
CA        2959217 A1     8/2018
(Continued)

OTHER PUBLICATIONS

KB Killbros, 1950 Dual-Auger Grain Cart, 2016, 8 pages.
German Search Report issued in application No. 102024109763.9 dated Nov. 13, 2024, 08 pages.

*Primary Examiner* — Jelani A Smith
*Assistant Examiner* — Dana D Ivey
(74) *Attorney, Agent, or Firm* — Taft Stettinius & Hollister LLP; Stephen F. Rost

(57)                  ABSTRACT

Systems and methods for automatic unloading of harvested material from a grain cart to storage compartment(s). In response to activation of the system by an operator, harvested material can be automatically unloaded into the storage compartment based on a predetermined fill profile. The fill profile can provide an indication of the maximum height, weight, and distribution profile(s), among other information, for the one or more piles of the harvested material that are to be formed in the storage compartment. Information provided from a sensor can be utilized by a controller to determine whether adjustments are to be made during the unloading of the harvested material so as to attain the fill profile. Such adjustments can relate to the rate, quantity, and/or location at which harvested material is being unloaded into the storage compartment, as well as a speed and direction of travel of the grain cart.

20 Claims, 7 Drawing Sheets

(51) Int. Cl.
| | |
|---|---|
| *B65G 67/26* | (2006.01) |
| *B65G 65/46* | (2006.01) |
| *B65G 67/24* | (2006.01) |

(58) Field of Classification Search
USPC .......................................................... 701/50
See application file for complete search history.

(56) References Cited

U.S. PATENT DOCUMENTS

| | | | |
|---|---|---|---|
| 7,874,899 | B2 | 1/2011 | Mackin et al. |
| 8,032,255 | B2 | 10/2011 | Phelan et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,781,692 | B2 | 7/2014 | Kormann |
| 8,868,304 | B2 | 10/2014 | Bonefas |
| 9,043,096 | B2 | 5/2015 | Zielke et al. |
| 9,049,817 | B2 | 6/2015 | McCully et al. |
| 9,113,588 | B2 | 8/2015 | Kormann |
| 9,119,342 | B2 | 9/2015 | Bonefas |
| 9,169,032 | B2 | 10/2015 | Gengerke |
| 9,185,845 | B2 | 11/2015 | Van Mill et al. |
| 9,187,259 | B2 | 11/2015 | Van Mill et al. |
| 9,272,853 | B2 | 3/2016 | Van Mill et al. |
| 9,326,444 | B2 | 5/2016 | Bonefas |
| 9,374,939 | B2 | 6/2016 | Pickett et al. |
| 9,392,746 | B2 | 7/2016 | Darr et al. |
| 9,457,971 | B2 | 10/2016 | Bonefas et al. |
| 9,499,140 | B2 | 11/2016 | Lanier et al. |
| 9,529,364 | B2 | 12/2016 | Foster et al. |
| 9,545,048 | B2 | 1/2017 | Pickett et al. |
| 9,596,805 | B2 | 3/2017 | Van Mill et al. |
| 9,596,809 | B2 | 3/2017 | Van Mill et al. |
| 9,615,509 | B2 | 4/2017 | Flickinger et al. |
| 9,642,305 | B2 | 5/2017 | Nykamp et al. |
| 9,763,389 | B2 | 9/2017 | Bump et al. |
| 9,807,933 | B2 * | 11/2017 | Boyd .................... A01D 41/127 |
| 9,820,436 | B2 | 11/2017 | Inoue et al. |
| 9,861,040 | B2 | 1/2018 | Bonefas |
| 9,873,570 | B2 | 1/2018 | Van Mill et al. |
| 10,015,928 | B2 | 7/2018 | Nykamp et al. |
| 10,019,790 | B2 | 7/2018 | Bonefas et al. |
| 10,028,434 | B2 | 7/2018 | Van Mill et al. |
| 10,028,441 | B2 | 7/2018 | Van Mill et al. |
| 10,028,442 | B1 | 7/2018 | Crosby |
| 10,106,333 | B2 | 10/2018 | Beaujot et al. |
| 10,154,625 | B2 * | 12/2018 | Walker ............... A01D 41/1274 |
| 10,278,328 | B2 | 5/2019 | Thomson et al. |
| 10,292,327 | B2 | 5/2019 | Ducroquet et al. |
| 10,351,364 | B2 | 7/2019 | Green et al. |
| 10,406,961 | B2 | 9/2019 | Grodecki et al. |
| 10,664,726 | B2 | 5/2020 | Wellington et al. |
| 10,760,946 | B2 | 9/2020 | Meier et al. |
| 10,765,063 | B2 | 9/2020 | Van Mill et al. |
| 10,807,812 | B2 | 10/2020 | Thomson et al. |
| 10,830,634 | B2 | 11/2020 | Blank et al. |
| 11,008,177 | B2 | 5/2021 | Banthia et al. |
| 11,240,961 | B2 | 2/2022 | Anderson et al. |
| 11,272,667 | B2 | 3/2022 | Bump et al. |
| 11,310,963 | B2 | 4/2022 | Burnley et al. |
| 11,457,562 | B2 | 10/2022 | Van Mill et al. |
| 11,659,788 | B2 | 5/2023 | Puryk et al. |
| 11,825,765 | B2 | 11/2023 | Van Mill et al. |
| 11,930,738 | B2 | 3/2024 | O'Connor et al. |
| 2009/0321154 | A1 | 12/2009 | Johnson |
| 2010/0287899 | A1 * | 11/2010 | Mackin .................. A01F 12/46 56/10.2 R |
| 2011/0220677 | A1 | 9/2011 | Bertolani |
| 2012/0099948 | A1 | 4/2012 | Bump et al. |
| 2014/0277963 | A1 | 9/2014 | Van Mill et al. |
| 2014/0286731 | A1 * | 9/2014 | Van Mill ........... B65G 69/0441 414/21 |
| 2015/0101519 | A1 | 4/2015 | Blackwell et al. |
| 2018/0025254 | A1 * | 1/2018 | Wellington ......... G06V 10/993 382/110 |
| 2018/0242521 | A1 | 8/2018 | Thomson et al. |
| 2018/0244477 | A1 | 8/2018 | Stilborn et al. |
| 2019/0322461 | A1 | 10/2019 | Banthia et al. |
| 2021/0195840 | A1 * | 7/2021 | Puryk .................... A01D 90/10 |
| 2021/0294337 | A1 | 9/2021 | Van Mill et al. |
| 2021/0333790 | A1 | 10/2021 | Kean et al. |
| 2022/0071078 | A1 | 3/2022 | Boyer et al. |
| 2022/0197302 | A1 | 6/2022 | Mcclelland et al. |
| 2022/0228902 | A1 | 7/2022 | Von Muenster |
| 2022/0228906 | A1 | 7/2022 | Von Muenster |
| 2022/0348412 | A1 | 11/2022 | Cauley |
| 2022/0397442 | A1 | 12/2022 | O'Connor et al. |
| 2022/0408641 | A1 | 12/2022 | Van Mill et al. |
| 2022/0410704 | A1 | 12/2022 | O'Connor et al. |
| 2023/0031013 | A1 | 2/2023 | Faust et al. |
| 2023/0093038 | A1 | 3/2023 | Schlimgen et al. |
| 2024/0032474 | A1 | 2/2024 | Ritter et al. |

FOREIGN PATENT DOCUMENTS

| | | | |
|---|---|---|---|
| CA | 2959257 | A1 | 8/2018 |
| DE | 102014105643 | A1 | 10/2014 |
| EP | 2245916 | B1 | 2/2013 |
| GB | 1104906 | A | 3/1968 |
| JP | 2023027997 | A | 3/2023 |
| WO | 2018102524 | A1 | 6/2018 |
| WO | 2022036114 | A1 | 2/2022 |
| WO | 2023150219 | A1 | 8/2023 |

* cited by examiner

SYSTEMS AND METHODS FOR AUTOMATED GRAIN CART UNLOADING

CROSS-REFERENCE TO RELATED APPLICATIONS

The present application is a U.S. non-provisional application that claims the benefit of U.S. provisional application No. 63/495,912, filed on Apr. 13, 2023, which is incorporated herein by reference in its entirety.

FIELD OF THE DISCLOSURE

The present disclosure generally relates to grain carts, and more specifically, but not exclusively, to systems and methods for automated unloading of grain carts.

BACKGROUND

An agricultural harvester, such as, for example, a combine, generally accumulates harvested material during operation, including while traveling along a field containing crop material. At certain times during such harvesting operations, the harvested material can be transferred from the harvester to a grain cart, also referred to as a wagon, that can be positioned by the harvester as the harvester moves through the field. Once the grain cart is sufficiently filled, the grain cart can travel to a receiving vehicle, such as, for example, one or more semi-trailers, for transfer, or unloading, of the harvested material to the trailer.

Traditionally, an operator of a tractor that is pulling the grain cart carefully maneuvers the grain cart relative to the trailer(s) as harvested material is transferred from the grain cart to the trailer. However, various factors can adversely impact such transfer or unloading of harvested material to the trailer. For example, misalignment between the grain cart, or components of the grain cart, and the trailer during the transfer can contribute spillage or other potential loss of the harvested material. Additionally, a variety of settings, relative positions, or environmental conditions, as well as combinations thereof, among other factors, can contribute to uneven distribution in terms of the spreading or accumulation of transferred harvested material within the trailer. Such uneven distribution can create issues with respect to either or both the quantity of the harvested material that may be placed in the trailer or load distribution of the trailer, among other potential issues.

Accordingly, the unloading or transfer of harvested material from grain carts remains an area of interest.

SUMMARY

The present disclosure may comprise one or more of the following features and combinations thereof.

In one embodiment of the present disclosure, an apparatus is provided for unloading a harvested material to a storage compartment. The apparatus can include a plurality of sidewalls that at least partially define an inner area, the inner area configured to house the harvested material. The apparatus can also include a conveyance assembly comprising a base portion, a conveyance means, and a chute, and a gate that can be configured to control a passage of the harvested material from the inner area to the base portion. Additionally, the conveyance means can be configured to convey the harvested material from the base portion to the chute, the chute being configured to release at least a portion of harvested material into the storage compartment. The apparatus can also include a sensor that can be configured to capture a captured information of the harvested material in the storage compartment and at least one processor. Further, the apparatus can include a memory device coupled with the at least one processor. The memory device can include instructions that when executed by the at least one processor can cause the at least one processor to identify a fill profile corresponding to at least one of a location or a height of one or more piles of harvested material that are to be formed within the storage compartment from the harvested material released from the chute. Additionally, the memory device can include instructions that when executed by the at least one processor can cause the at least one processor to determine, from information provided by or from the captured information, and based on the fill profile, whether to adjust a position of at least one of the gate, the apparatus, and the conveyance assembly, and generate an adjustment signal to adjust, based on an outcome of the determination, at least one of the position of the gate, the apparatus, and the conveyance assembly to adjust either or both a location or rate at which the harvested material is released from the chute.

In another embodiment, a method is provided for unloading a harvested material to a storage compartment. The method can include displacing, by a gate actuator, a gate from a closed position to an at least partially open position, and conveying the harvested material that passed by the gate along a conveyance means to a chute of a conveyance assembly. The chute can be configured to deposit at least a portion of the harvested material into the storage compartment. Additionally, a sensor can capture a captured information of the harvested material deposited into the storage compartment. The method can also include identifying a fill profile corresponding to at least one of a location or a height of one or more piles of harvested material that are to be formed within the storage compartment from the harvested material deposited into the storage compartment. From information provided by or from the captured information, and based on the fill profile, a determination can be made as to whether to adjust a position of at least one of the gate or the conveyance assembly. The method can also include adjusting, based on an outcome of the determination, at least one of the position of the gate or the conveyance assembly to adjust either or both a location and a rate at which the harvested material is being deposited into the storage compartment.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
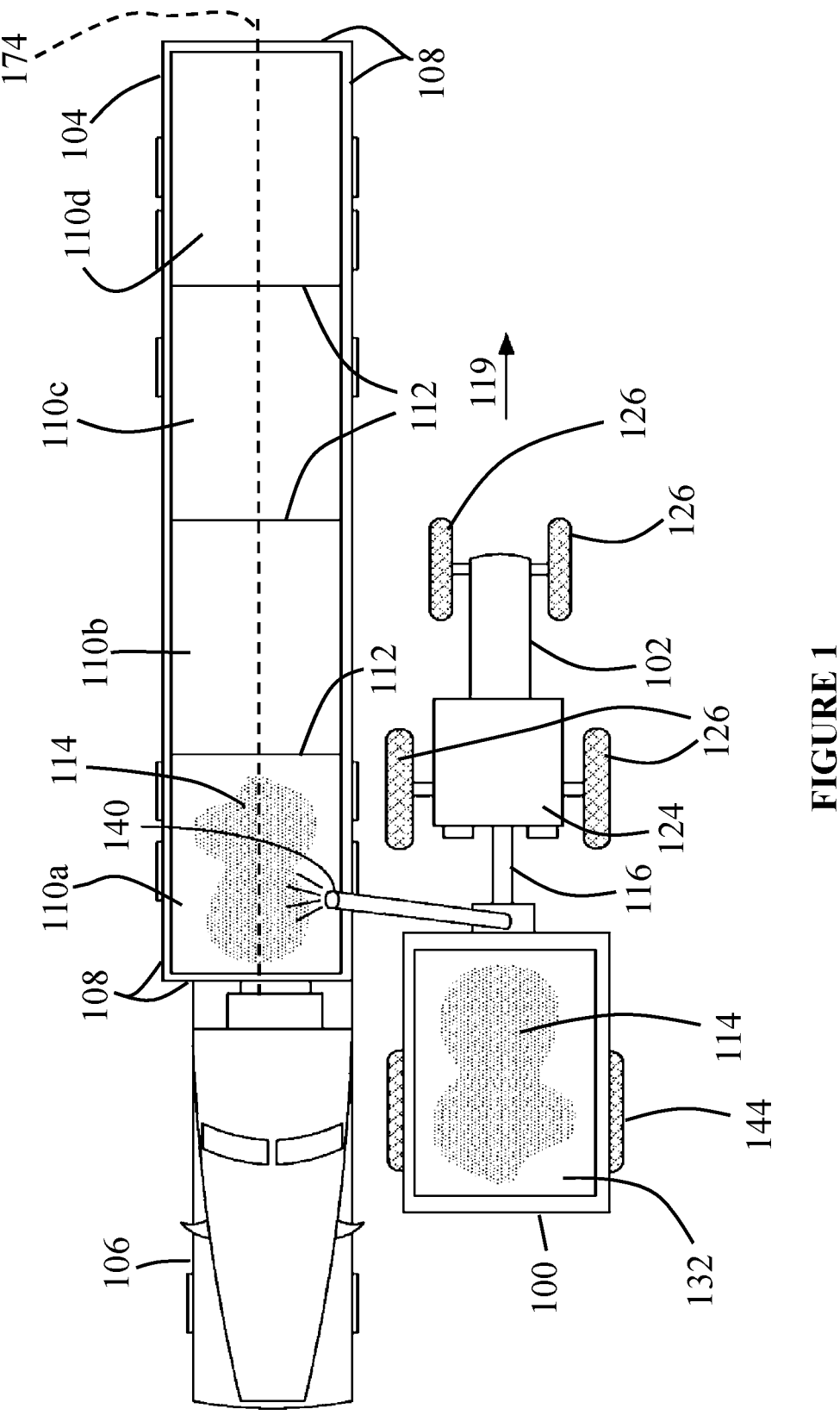
FIG. 1 illustrates a top plan view of an exemplary grain cart unloading grain into a storage compartment of a semi-trailer.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Disclosed are examples of automated grain cart unloading systems, methods and machine-readable mediums that monitor characteristics regarding the unloading of harvested material from a grain cart, including the distribution of the unloaded harvested material in an associated storage trailer. Embodiments disclosed herein also relate to automatically adjusting the operations, movement, and/or positions of the grain cart, including an associated conveyance assembly, in response to at least identified characteristics relating to the distribution of the harvested material in the trailer.

FIG. 1 illustrates a top plan view of an exemplary grain cart 100 being pulled by a towing machine 102 and unloading grain into a grain trailer 104 that is coupled to a semi-truck 106. The trailer 104 can include a plurality of sidewalls 108 that can at least partially define one or more storage compartments 110a-d within the trailer 104, among storage compartments of other equipment, such as, for example, gravity wagons and mother-bin, among other equipment or structures. The trailer 104 can also include one or more partition walls 112 that extend between opposing sidewalls 108, and which, in combination with the sidewalls 108, can also at least partially define the storage compartments 110a-d of the trailer 104. The sidewalls 108 can also at least partially define an opened upper area of the trailer 104 that can accommodate passage of harvested material 114 that is being unloaded from the grain cart 100 and into a storage compartment(s) 110a-d.

In the illustrated embodiment, the grain cart 100 is coupled to a towing machine 102, such as, for example, a tractor, via a hitch 116, which can be attached to a frame of the grain cart 100. In such an embodiment, the towing machine 102 can have a propulsion system 118 (FIG. 4) that can include a prime mover 120 (FIG. 5), such as, for example, an internal combustion, electric, or hybrid, engine or motor, that can provide a force to propel the grain cart 100 in at least a forward direction 119 of travel, and in a direction that is reverse to the forward direction 119 of travel. As shown, in the illustrated embodiment, the towing machine 102 has an operator cab 124 and a plurality of engagement bodies 126, such as, for example, wheels or tracks, that can travel along a ground surface 128 (FIG. 2) of the field. The operator cab 124 can be sized for placement of the operator as the operator operates the towing machine 102. Alternatively, according to certain embodiments, the towing machine 102 can be an autonomous vehicle. Further, according to other embodiments, rather than being coupled to a towing machine 102, or other agricultural machine, the grain cart 100 can be an autonomous, or self-propelled, vehicle.

The grain cart 100 can include a plurality of sidewalls 130 that can, at least in part, generally define an inner area 132 of the grain cart 100 that can house harvested material 114. While the inner area 132 is shown in FIG. 1 as being uncovered, according to certain embodiments, the grain cart 100 can also include a cover or roof that can extend over at least a portion of the inner area 132. The grain cart 100 can also include a plurality of engagement bodies 114, such as, for example, wheels or tracks, that are positioned to roll along the ground surface 128. The grain cart 100 can also include a selectively displaceable conveyance assembly 134 that can be used in the conveyance or unloading of harvested material 114 from the grain cart 100 and to the trailer 104.

Figure 2:
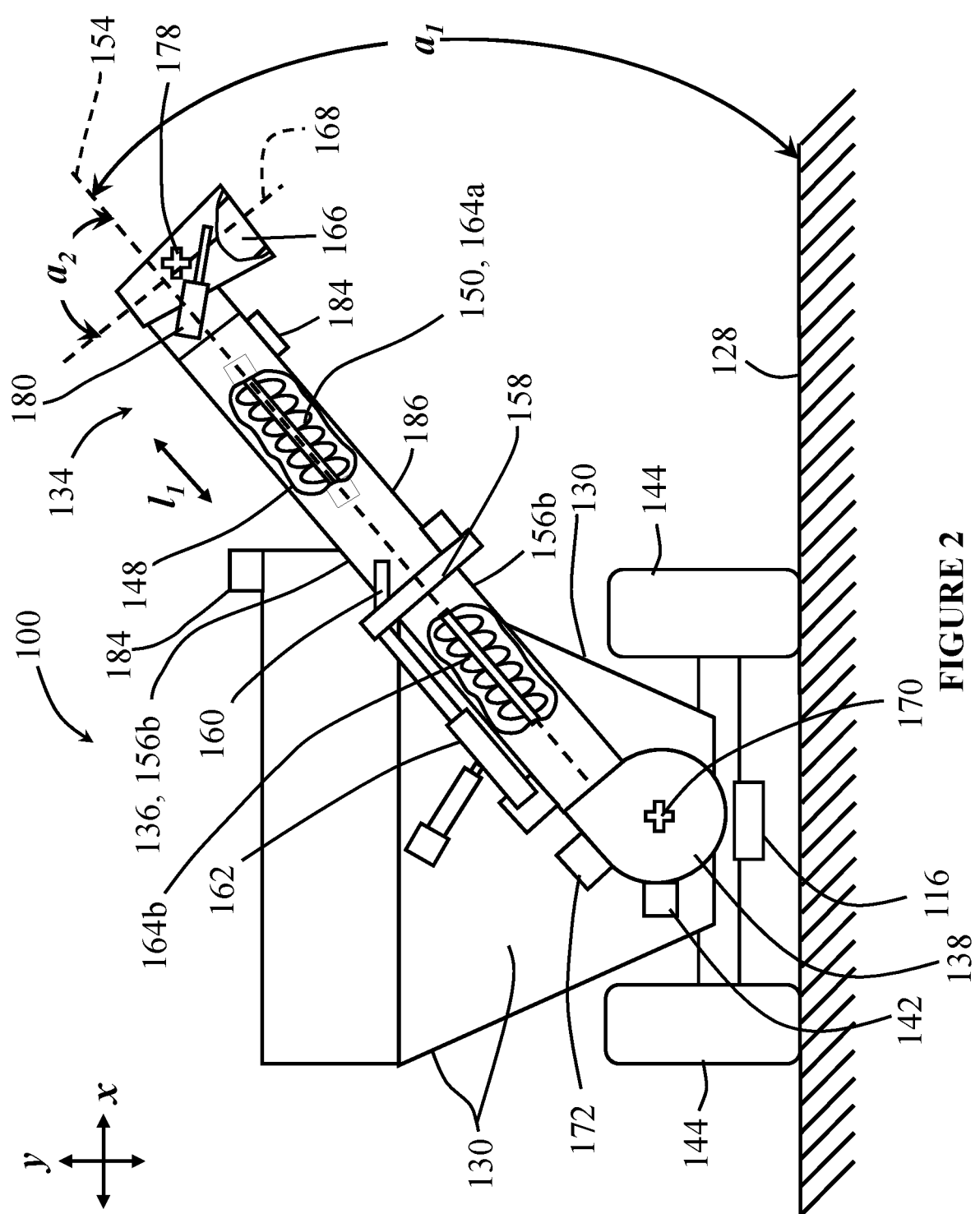
FIG. 2 illustrates a partial cutaway side view of an exemplary grain cart and in which a conveyance assembly of the grain cart is at an unfolded position.

Referencing FIG. 2, the illustrated conveyance assembly 134 can include a conveyance housing 136 that extends from a base portion 138 to a chute 140 of the conveyance assembly 134. The base portion 138 can be positioned adjacent to, or include, a gate 142 that is selectively displaceable, such as, for example, slidingly displaceable, via operation of an associated gate actuator 228 (FIG. 4) between an open position and a close position, as well as positions therebetween. The position of the gate 142, which can be detected via use of a gate sensor 146 (FIG. 4), can at least control whether, or the rate at which, harvested material 114 in the inner area 132 of the grain cart 100 can, or cannot, flow into the base portion 138 of the conveyance assembly 134. Thus, for example, the gate 142 can be displaced from the close position at which the gate 142 covers or blocks a passage between the inner area 132 of the grain cart 100 and the base portion 138, to an open position at which the gate 142 generally does not impede the flow of the harvested material from the inner area 132 of the grain cart 100 passing through the passage and into the base portion 138. Additionally, according to certain embodiments, the gate 142 can be operably positioned at various positions between the open and closed positions so as to control the amount, or rate, at which harvested material 114 can pass from the inner area 132 of the grain cart 100 to the base portion 138. As discussed below, such positioning of the gate 142 can provide at least one approach to controlling the amount, or rate, at which harvested material 114 is unloaded from the grain cart 100 to the trailer 104.

A variety of different types of devices can be utilized for the gate sensor 146, including, but not limited to, an optical sensor, among other types of sensors. Additionally, according to certain embodiments, the gate position can be indirectly detected or determined, such as, for example, via determinations regarding the amount, or rate, at which harvested material is flowing into the base portion and/or is being unloaded from the grain cart 100. For example, according to certain embodiments, the position of gate 142 can be determined using information regarding a change in weight of the grain cart 100. Information regarding the weight change of the grain cart 100 can indicate a mass flow rate for the harvested material 114 being unloaded, which can be used to estimate the flow of harvested material 114 passing through the gate 142, which can provide an indication of a position of the gate 142. A flow rate of harvested material traveling along, or being outputted from, the conveyance assembly 134 can similarly provide information that can be used to derive the rate of flow of material passing through the gate 142, which can similarly be used to determine the position of the gate 142.

Figure 4:
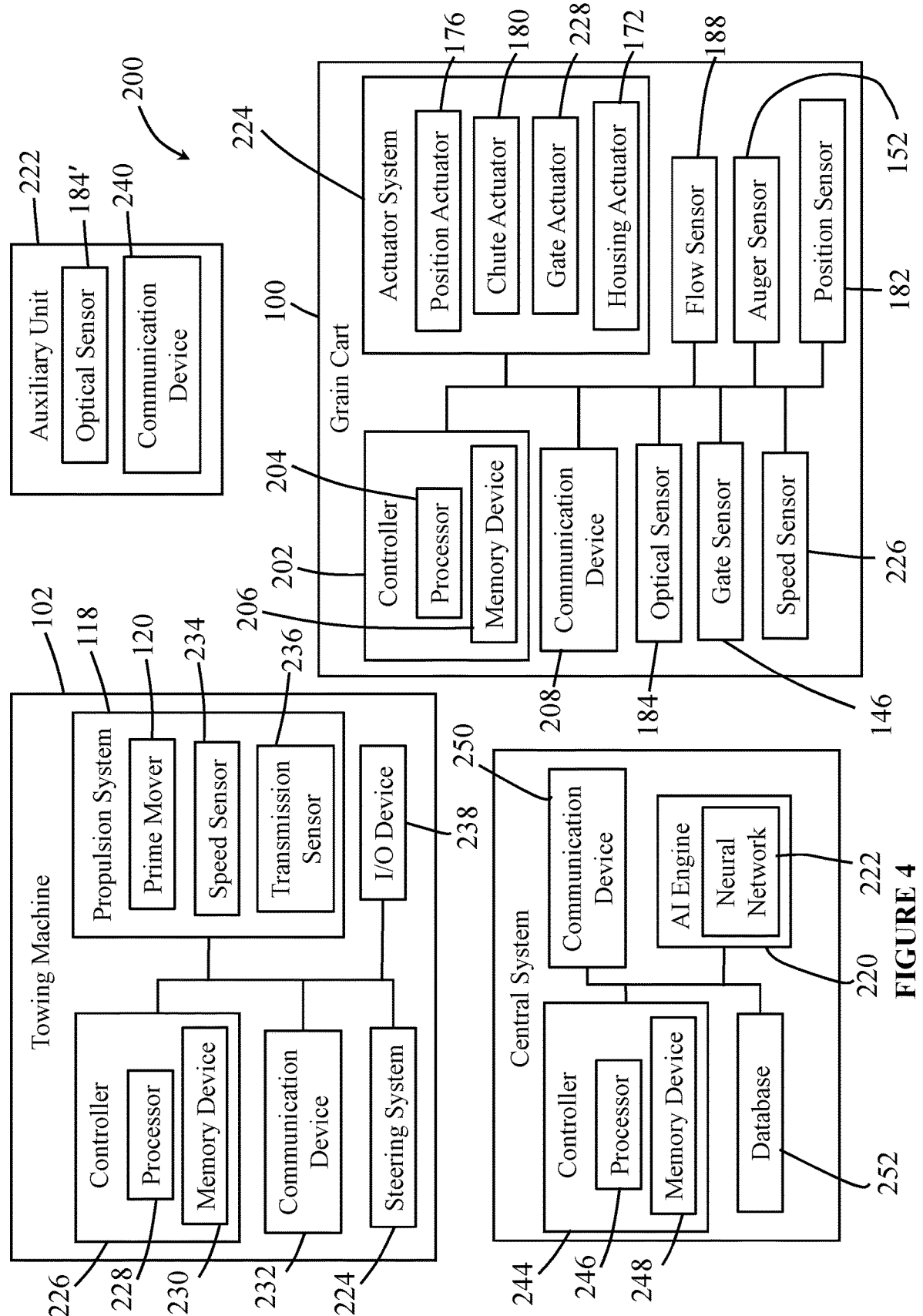
FIG. 4 illustrates a block diagram of an exemplary automated grain cart unloading system.

The conveyance housing 136 can define and interior passageway 148 for placement of at least a portion of a conveyance means for conveying harvested material 114 from the base portion 138 to the chute 140. A variety of different types of devices or assemblies can be utilized by the conveying means, including, for example, an auger 150 or a conveyor belt, among other means for transporting or moving the harvested material 114. For example, according to certain embodiments, the conveyance means is an auger 150 that is operably coupled to a Power Take Off (PTO) drive of the prime mover 120 of the towing machine 102, or, alternatively, of the grain cart 100. According to such an embodiment, operation of the prime mover 120 can be utilized to power rotational displacement of the auger 150 within the conveyance housing 136, which may be monitored using one or more auger sensors 152 (FIG. 4). The auger 150 can have one or more helical or spiral oriented threads or twists positioned around a shank that, upon rotational displacement of the auger 150, can be utilized to at least upwardly displace harvested material 114 from the base portion 138 to the chute 140. According to certain embodiments, the auger 150 can be positioned at a location that is generally parallel to, and possibly aligned with, a central longitudinal axis 154 of the conveyance housing 136 and/or the interior passageway 148.

Figures 3A, 3B:
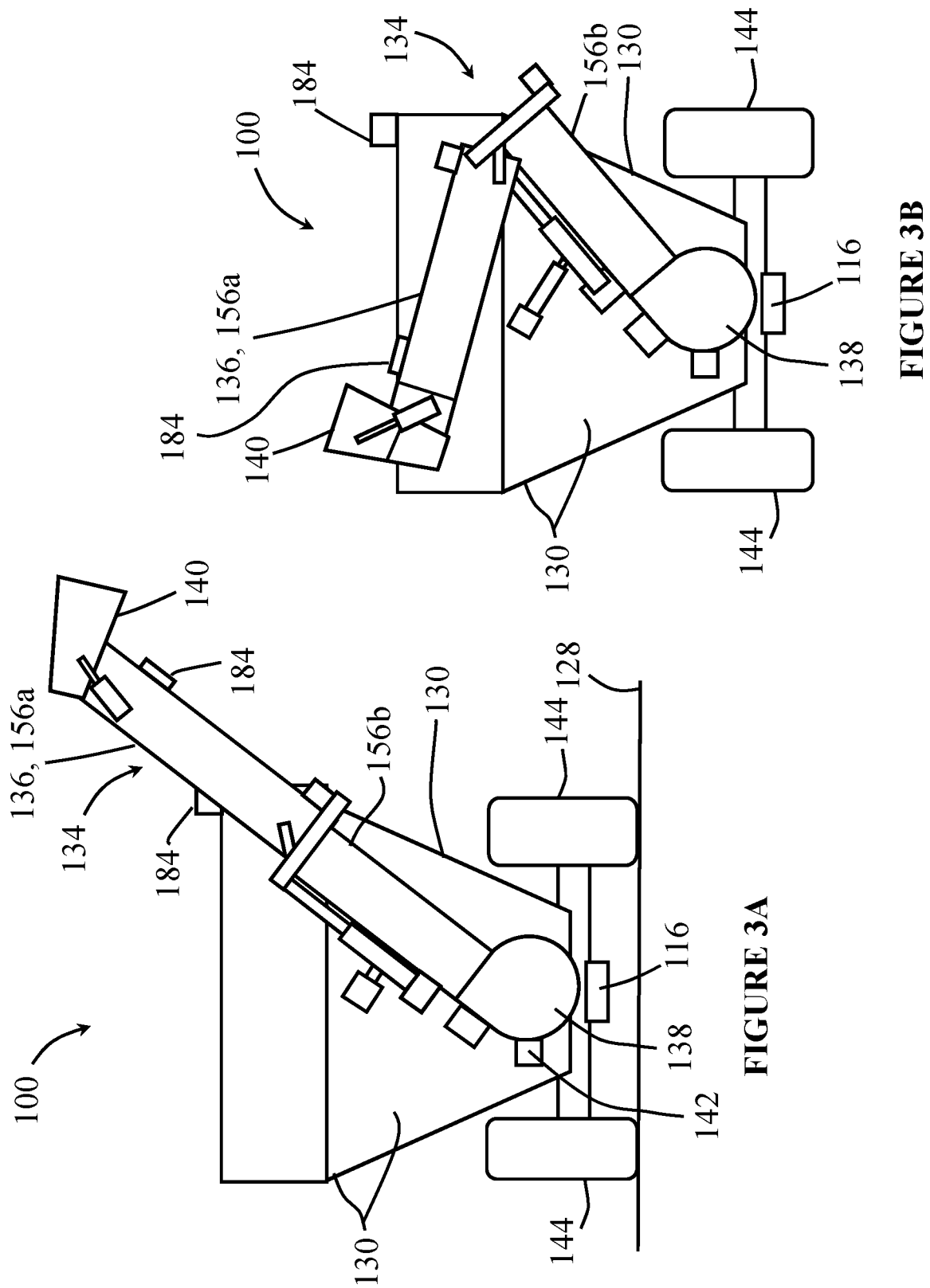
FIG. 3A illustrates the grain cart shown in FIG. 2 with the conveyance assembly and chute of the conveyance assembly at angular orientations that are different than those shown in FIG. 2.
FIG. 3B illustrates the grain cart shown in FIG. 2 with the conveyance assembly at the folded position.

According to certain embodiments, the conveyance housing 136 can comprise an upper housing 156a that is pivotally coupled to a lower housing 156b of the conveyance housing 136 at a fold joint 158. Further, the lower housing 156b can be positioned between the base portion 138 and the fold joint 158. According to such an embodiment, one or more fold linkages 160 and a fold actuator 162, such as, for example, a hydraulic or pneumatic actuated cylinder, can be utilized to selectively displace the upper housing 156a relative to the lower housing 156b between an unfold position (FIGS. 2 and 3A) and a folded position (FIG. 3B). According to such an embodiment, the auger 150, or other conveyance means, can have a first portion 164a positioned in the upper housing 156a and a second portion 164b positioned in the lower housing 156b. The first and second portions 164a, 164b can be operably coupled or connected when the auger 150 is at the unfolded position such that rotational displacement of the lower portion 164b via the PTO can be transferred to facilitate rotational displacement of the upper portion 164a, or vice versa. Similarly, the first and second portions 164a, 164b can be decoupled or disconnected when the upper housing 156a is displaced from the folded position to the unfolded position.

Harvested material 114 can be transported along the interior passageway 148 of the conveyance housing 136 to the chute 140, wherein the harvested material 114 can be outputted or discharged through a chute outlet 166. The chute outlet 166 can generally be an opening at an end of the chute 140 that is in fluid communication with the interior passageway 148. According to certain embodiments, the chute outlet 166 can be arranged about a chute axis 168. Additionally, as discussed below, according to certain embodiments, the chute 140 can be pivotally coupled to upper housing 156a, and, additionally or alternatively, can be configured to be rotatably displaced about the central longitudinal axis 154 of the conveyance housing 136 and/or the interior passageway 148.

The location, including direction and angle, at which harvested material 114 is outputted or discharged from the chute 140 can be adjusted in a variety of manners. For example, according to certain embodiments, at least the conveyance housing 136 is selectively rotatably displaceable about a first rotational axis 170, and relative to at least the ground surface 128. Additionally, or alternatively, at least a portion of the base portion 138 can be rotatably displaced with the rotational displacement of the conveyance housing 136. While FIG. 2 illustrates the first rotational axis 170 extending through the base portion 138, the first rotational axis 170 can be located at a variety of other locations. Additionally, such rotational displacement of at least the conveyance housing 136, and thus the conveyance means or auger 150 positioned therein, can be facilitated by use of a housing actuator 172, such as, for example, one or more of an electric motor, hydraulic cylinder, or pneumatic cylinder, as well as combinations thereof, among other types of actuators.

As indicated in FIG. 2, such rotational displacement of the conveyance housing 136 can adjust a first angle ("$a_1$") that generally corresponds, for example, to at least an angle of the central longitudinal axis 154 of the conveyance housing 136 and/or the interior passageway 148 relative to the ground surface 128. Thus, as indicated by at least a comparison of the vertical location of the chute 140 in FIGS. 2 and 3A, as the chute 140 is coupled to, or around, an end of the conveyance housing 136, such rotational displacement of the conveyance housing 136 about the first rotational axis 170 can adjust a vertical height (as generally indicated by the "y" direction in FIG. 2) of at least the chute 140. According to such an embodiment, such rotational displacement of at least the conveyance housing 136 can increase or decrease a distance of vertical separation between the location at which harvested material 114 is being released from the chute outlet 166 and the below storage compartment 110$a$-$d$, which can influence the location at which harvested material is deposited, piled, and/or spread within the storage compartment 110$a$-$d$.

Additionally, the rotational displacement of the conveyance housing 136 can also adjust a horizontal position (as generally indicated by the "x" direction in FIG. 2) of the chute 140. For example, the rotational displacement of the conveyance housing 136 can move the chute 140, and thus the chute outlet 166, to a location at which the chute 140 and/or chute outlet 166 are at their furthest distance in the horizontal direction away from the grain cart 100 and/or the inner area 132 of the grain cart 100, which can be referred to as the fully extended position of the conveyance assembly 134. Such differences in the horizontal position of the chute 140 is indicated, for example, by a comparison of the location of the chute 140 in FIGS. 2 and 3A. Thus, such rotational displacement of the conveyance housing 136 can be utilized to adjust the distance between the chute outlet 166 and a central axis 174 (FIG. 1) of the storage compartments 110$a$-$d$. In the illustrated example, the central axis 174 of the storage compartments 110 can extend at a generally central location through each of the storage compartments 110$a$-$d$ and/or a length of the trailer 104 in a direction that can be generally parallel to the forward direction 119 of travel. The distance at which the chute outlet 166 is, or is not, separated from the central axis 174 of the storage compartments 110$a$-$d$ can impact the location at which harvested material 114 is deposited into, and/or spread within, the storage compartments 110$a$-$d$.

The conveyance housing 136 can also be rotatably and/or linearly displaced in a variety of other directions. For example, according to certain embodiments, the upper and lower housings 156$a$, 156$b$ can be also telescopically arranged. According to such an embodiment, the linear position of one of the first and second housings 156$a$, 156$b$ can be adjusted (as generally indicated by "l" in FIG. 2) relative to the other housing 156$a$, 156$b$. Such a telescopic arrangement can also be utilized to adjust the vertical height of the chute 140 and/or chute outlet 166, as well as adjust the horizontal position of the chute 140 and/or chute outlet 166 relative to the central longitudinal axis 174 of the storage compartments 110$a$-$d$. Such other adjustments of the conveyance housing 136 can occur in a variety of manners, including, for example, via use of a housing position actuator 176, such as an electric motor, hydraulic cylinder, or pneumatic cylinder, as well as combinations thereof, among other actuators.

Additionally, or alternatively, the chute 140 can be rotatably displaced relative to the conveyance housing 136. For example, in the embodiment shown in FIG. 2, the chute 140 can be rotatably displaced about a second rotational axis 178 via a chute actuator 180 and/or an associated rotor linkage system. A variety of different type of actuators can be utilized for the chute actuator 180, such as, for example, one or more of an electric motor, hydraulic cylinder, or pneumatic cylinder, as well as combinations thereof, among other types of actuators. As seen in FIG. 2, such rotational displacement of the chute 140, and thus the chute outlet 166, can adjust a second angle ("$a_s$") between the chute axis 168 and the central longitudinal axis 154 of the conveyance housing 136 and/or the interior passageway 148. Moreover, adjustment of the chute 140 about the second rotational axis 178 can adjust the degree or angle at which harvested material is downwardly and/or outwardly discharged from the chute outlet 166 and into a storage compartment 110$a$-$d$. Thus, such rotational displacement of the chute 140 about the second rotational axis 178 can also influence the distribution, piling, and/or spreading of harvested material 114 in a storage compartment 110$a$-$d$.

Additionally, according to certain embodiments, the chute 140 can also be rotatably displaced in another direction, including, for example, in a direction that can be generally orthogonal to the second rotational axis 178. For example, according to certain embodiments, the chute 140 can also be rotatably displaced relative to central longitudinal axis 154 of the conveyance housing 136 and/or the interior passageway 148. The displacement of the chute 140 in a variety of other rotational and/or linear directions are also contemplated.

The position, orientation, and/or locations of the various components of the conveyance assembly 134 can be detected in a variety of manners, including, for example, via one or more position sensors 182 (FIG. 4), including, but not limited to, inclinometers, proximity sensors, optical sensors, and/or pressure sensors, among others. For example, whether the conveyance assembly 134, as well as portions thereof, such as, for example, the auger, is at, or is approaching, the fully extended position can be detected by one or more position sensors 182, including, for example, comprise at least a pressure sensor. Additionally, angular orientations of components of the conveyance assembly 134, including, for example, the conveyance housing 136, spout, and/or chute 140 can be determined utilizing one or more position sensors 182, such as, for example, rotary position sensors and angular position sensors. Further, linear positions of the components of the conveyance assembly 134, including, for example, with respect to telescopically arranged upper and lower housings 156$a$, 156$b$, can also be determined via use of one or more position sensors 182, such as, for example, near position sensors, among others.

The grain cart 100 can also include one or more sensors 184 that can be positioned to capture information, including, but not limited to, one or more images (collectively referred to herein as "image"), such as, for example, video and still images, of harvested material 114 that is being, or has been, deposited in a storage compartment(s) 110$a$-$d$. While exemplary embodiments discussed herein may refer to captured information in the form of images, the type, format, and/or information provided by the captured information obtained via use of the sensor 184 can vary for different types of sensors and/or sensing technologies. As discussed below, information obtained from such images, as well as other forms of captured information, can be utilized in connection with adjustments in the settings, positions, or orientations of the grain cart 100 and/or the conveyance assembly 134 in connection with seeking to attain a pre-determined fill profile for the harvested material 114 within the storage compartment 110a-d. A variety of different types of devices can be utilized for the sensor 184, such as, for example, optical cameras and/or depth cameras or sensors, including, but not limited to, visible light cameras, near-visible light cameras, infrared cameras, optical cameras, stereo depth cameras, stereo sensors, mono cameras, time of flight sensors, RGBD (red, green, blue, depth) cameras, three-dimensional sensors, three-dimensional cameras, structural light sensors, light detection ranging sensors, thermal imaging cameras, ultrasonic sensors, radar, radar-based cameras, hyperspectral cameras, and light imaging detection and radiation (LIDAR) sensors, as well as combinations thereof, among others.

The sensors 184 can be positioned at one or more locations about the grain cart 100 that can capture images harvested material 114 within at least a portion of one or more of the storage compartments 110a-d. For example, according to certain embodiments, at least one sensor 184 can be coupled to the conveyance housing 136, including at or around a bottom surface 186 of the conveyance housing 136 at a location that is in relatively close proximity to the chute 140. Additionally, or alternatively, a sensor 184 can be coupled to the chute 140 and/or an upper portion of a sidewall 130, roof, or cover of the grain cart 100, among other locations.

Additionally, according to certain embodiments, the conveyance assembly 134 can include one or more flow sensors 188 (FIG. 4). According to certain embodiments, the flow sensor(s) 188 can be positioned to determine flow or quantity of harvested material that is passing from the inner area 132 and into the base portion 138. Additionally, or alternatively, a flow sensor 188 could be positioned to detect an amount of harvested material 114 being displaced by the auger 150, or passing through the chute outlet 166. Further, according to certain embodiments, information obtained from images provided by the sensor 184 can be examined to determine flow rates.

FIG. 4 illustrates a block diagram of an exemplary automated grain cart unloading system 200. The system 200 can include a grain cart controller 202 having one or more processors 204 that can follow instructions, including control instructions, contained on one or more memory devices 206, including, for example, a non-transitory machine-readable medium. Further, the grain cart controller 202 can be part of the grain cart 100 or the towing machine 102, among other machines or components of the automated grain cart unloading system 200.

According to certain embodiments in which the sensor(s) 184 is/are an optical camera, the controller 202, including the processor 204, can evaluate captured information from the images obtained by the sensors 184 in a variety of manners. For example, according to certain embodiments, the controller 202 can evaluate the unloading, distribution/ piling, and/or spreading of harvested material 114 in a storage compartment 110a-d on a pixel level, or based on a collection or area(s) of pixels, among other bases for evaluation. Such an evaluation can be based, for example, at least in part on either or both a color and level of light present, or not present, in an area(s) or pixels in the captured information.

The controller 202 can also be configured to identify information regarding the unloading, distribution and/or spreading of harvested material by the grain cart 100 and into the storage compartment(s) 110a-d based on a size, shape, and/or position of the information captured in the images from the sensor 184. Information can also be derived from images captured by the sensor 184 based on an indication of movement, such as based on a change in position of one or more collections or piles of harvested material 114 in a storage compartment 110a-d. For example, the controller 202 can be configured to identify a collection of harvested material 114 in the storage compartment 110a-d based on the size, shape, or position of the harvested material 114 compared to other features of the storage compartment 110a-d. Additionally, or alternatively, the controller 202 can be configured to identify changes in deposited harvested material 114 by evaluation or comparison of information provided by different images or information obtained from the sensor 184. Additionally, the controller 202 can utilize captured information from images obtained by different sensors 184 to determine characteristics regarding the unloading, distribution, and spreading of the harvested material 114. According to certain embodiments, the controller 202 can also utilize information attained via the training of a neural network 220 of an artificial intelligence (AI) engine 222 to identify the presence and location of harvested material 114 and collections of harvested material 114 in the storage compartments 110a-d.

The controller 202 can also be adapted to utilize at least information provided by at least the sensor 184 to predict or estimate a direction at which the harvested material 114 will flow or accumulate when unloaded into the storage compartment 110a-d. For example, based on the location and/or orientation of at least the chute 140 or chute outlet 166 relative to the storage compartment, the rate at which harvested material 114 is being unloaded from the grain cart 100, the speed and/or direction of travel of the grain cart 100, configuration of the storage compartment 110a-d, and/ or the shape or position of one or more collections/piles of harvested material 114 in the storage compartment 110a-d, among other information, to determine, including estimate or predict, a location at which harvested material 114 being unloaded from the grain cart 100 will settle or otherwise be deposited in the storage compartment 110a-d. Using such information, the controller 202 can, for example, thus proactively make adjustments in the operation of the grain cart 100 in a manner that can further assist with distributing the harvested material 114 in the storage compartment 110a-d in a manner that can at least attempt to conform to a predetermined fill profile.

Accordingly, as discussed below, the controller 202, including the processor 204, can execute instructions contained in the memory device 206, as well as in connection with inputted information, to automatically adjust at least the operational settings, positions, travel, and/or orientations of the towing machine 102, grain cart 100, and/or the conveyance assembly 134, among other components and devices of the system 200, at least in connection with the unloading of harvested material 114 from the grain cart 100 to the trailer 104. Further, the controller 202, including the processor 204, can utilize a variety of different types of inputted information in connection with making such operational adjustments, including, but not limited to, information provided regarding a speed of travel, as may be indicated by a speed sensor 226 of the grain cart 100 and/or trailer 104, as well as information derived from one or more images provided by the sensor 184, among other inputted information, as discussed below.

Examples of such operational settings adjustable via one or more signals or commands from the controller 202, including from the processor 204, include, but are not limited to, adjusting a direction and/or speed of travel of the towing machine 102 and/or grain cart 100, activation and deactivation of the auger 150, a speed (e.g., revolutions per minute (rpm)) of the auger 150 or other conveyor means, an amount or flow rate of harvested material 114 being unloaded by the grain cart 100, and a linear position and/or angular orientation of either or both the conveyance housing 136, the chute 140, and/or chute outlet 166, among other operations or settings. Such adjustments can be made in at least an attempt to improve the quality of the distribution of harvested material 114 being deposited and/or within the storage compartments 110*a-d* of the trailer 104, including in connection with attaining a pre-determined fill profile. As discussed herein, such adjustments therefore include, but are not limited to, activation of one or more actuators of an actuator system 224 (FIG. 4) of the grain cart 100, including one or more of the housing actuator 172, chute actuator 180, gate actuator 228, and/or housing position actuator 176, among other actuators.

The grain cart 100 can further include a communications device 208 that can communicate information to, as well as receive information from, other components of the system 200, including the towing machine 102, a central system 220, and/or one or more auxiliary units 222, among other machines, devices, and databases. The communications device 208 can be embodied as hardware, firmware, software, virtualized hardware, emulated architecture, and/or a combination thereof. According to certain embodiments, the communications device 208 can comprise a transceiver. The communications device 208 can, according to certain embodiments, exchange communications with a other components of the grain cart 100 and/or the system 200 in a variety of manners, such as, for example, via a network, including, for example, via internet, cellular, and/or Wi-Fi networks, as well as via Bluetooth, among other manners or communication or use of other communication protocols.

The controller 202, including the processor 204, can also be utilized to generate commands for the operation of a propulsion system 118 and/or a steering system 224. While FIG. 4 illustrates the propulsion system 118 and steering system 224 as being part of the towing machine 102, according to other embodiments, the propulsion system 118 and steering system 224 can instead be part of a self-propelled, including autonomous, grain cart 100. Further, to the extent a towing machine 102 is utilized, the controller 202 of the grain cart 100 can be used to control and/or adjust, operations of the propulsion system 118 and/or a steering system 224, including adjust the speed and/or direction of travel of the towing machine 102 and grain cart 100.

Additionally, or alternatively, according to certain embodiments, the towing machine 102 can have a controller 226, including at least one processor 228 and memory device 230, as well as a communications device 232 that is similar to the corresponding controller 202, processor(s) 204, memory device 206, and communications device 208 of the grain cart 100. According to such embodiments, the controller 226 of the towing machine 102 can be utilized in addition to, or in lieu of, the controller 202 of the grain cart 100. Thus, while at least certain examples discussed herein are discussed in terms of use of the controller 202 of the grain cart 100, according to other embodiments, such features or operations can instead be performed by, or utilize, the controller 226 of the towing machine 102.

The propulsion system 118 can include the prime mover 120, a speed sensor 234, and a transmission sensor 236. As previously indicated, the prime mover 120 can generate power or force used for propulsion of the towing machine 102 and/or grain cart 100. The speed sensor 234 can be configured to detect, or provide information used to determine, a speed or rate of travel at which the work towing machine 102, grain cart 100, and/or one or more engagement bodies 126, 144 is/are currently traveling. Additionally, or alternatively, the speed sensor 234 can provide information indicating, or used to determine, whether the current speed of travel or movement has, or has not, exceeded a predetermined threshold, or, alternatively, has dropped below a predetermined speed threshold. The transmission sensor 236, such as, for example, a transmission position sensor or transmission range sensor, can be utilized to detect the currently engaged gear of a transmission that is utilized in the transmission of a force generated or provided by the prime mover 120 for driving movement of the engagement bodies 126, 144. Additionally, information provided by the transmission sensor 236 can be utilized to detect if the towing machine 102 and/or grain cart 100 is/are traveling in a forward or rearward direction of travel.

The trailer 104, or, alternatively, a self-propelled grain cart 100, can include one or more steering systems 224, including, for example, a front steering system and/or a rear steering system. The controller 202, 226, or a dedicated steering controller, can provide commands for controlling the steering system(s) of the trailer 104 or the self-propelled grain cart 100. Such signals can be utilized to operate one or more electric motors and/or actuators, or control the flow of a steering fluid, that are utilized to control the turning and/or orientation of the associated engagement bodies 126, 144 and/or an associated front or rear axle of trailer 104 and/or grain cart 100. Such a steering system 224 can be utilized to at least control the extent the grain cart 100 is separated from the trailer 104, or the distance, if any, between the chute outlet 166 and the central axis 174 of the storage compartments 110*a-d*, at least during the unloading of harvested material 114 from the grain cart 100.

The automated grain cart unloading system 200 can also include, or be communicatively coupled to, an input/output (I/O) device 238 that can be utilized to at least activate the grain cart 100 to perform an automatic unloading operation of the harvested material 114. For example, according to certain embodiments, the I/O device 238 can be a button, switch, or touchscreen located in the operator cab 124, or positioned at an operator accessible location along the grain cart 100. Additionally, or alternatively, the I/O device 238 can be a computing device that can be separable from the towing machine 102 or grain cart 100, including, for example, a mobile phone, smartphone, tablet, or personal computing device, that can wirelessly communicate an activation signal or command to a communications device 208, 232 of the grain cart 100 and/or towing machine 102.

Captured information used to identify or determine characteristics regarding the fill profile of harvested material 114 deposited within the storage compartment 110*a-d* can also be attained using sensors 184 in addition to, or in lieu of, an optical sensor(s) that may be attached to the grain cart 100. For example, according to certain embodiments, the automated grain cart unloading system 200 can include one or more auxiliary units 222 having one or more sensors 184' that can be similar to the sensor 184 discussed above with respect to the grain cart 100. Further, the auxiliary unit 222 can also include a communication device 240 that is configured to communicate the images, or associated information derived from the images, obtained by the sensor 184' of the auxiliary unit 222 to other communication devices 208, 232. The images attained by sensor 184' of the auxiliary unit(s) 222, or associated information derived therefrom, can be examined or analyzed and used in manner similar to the information attained from a sensor 184 of the grain cart 100.

A variety different types of devices or structures can be utilized for the auxiliary unit 222. For example, referencing FIG. 5, according to certain embodiments, one or more auxiliary units 222 can comprise a drone 242 having the sensor 184'. Similar to the above-discussed operation of the conveyance assembly 134, the drone 242 can also be operated so as to be moved to a position(s) at a location(s) and/or orientation(s) that can capture information regarding the fill pattern of the harvested material 114 that has been, and/or is being, deposited into in a storage compartment(s) 110*a-d* by the operation of the grain cart 100.

Additionally, or alternatively, one or more of the auxiliary unit 222 can be relatively static. For example, according to certain embodiments, the auxiliary unit 222 can be, or can be coupled to, a structure, including, for example, a building or post 244, among other generally static structures. According to such an embodiment, the trailer 104 can be positioned at a location that can enable the sensor 184' to obtain images of the harvested material 114 that has been, and/or is being, deposited into the storage compartment(s) 110*a-d* of the trailer 104.

Figure 5:
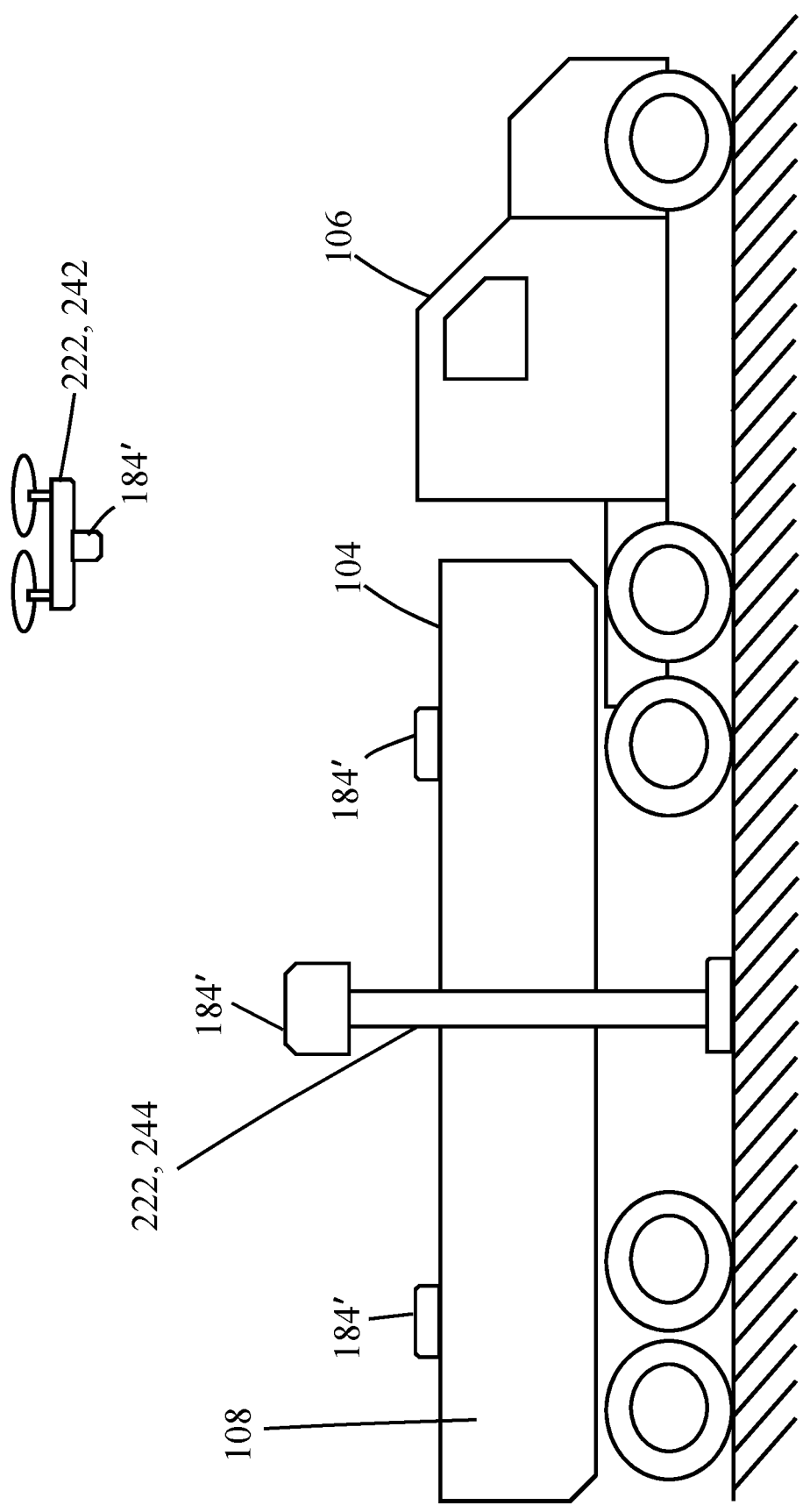
FIG. 5 illustrates examples of types and locations of auxiliary units for the exemplary automated grain cart unloading system.
Figures 6A, 6B:
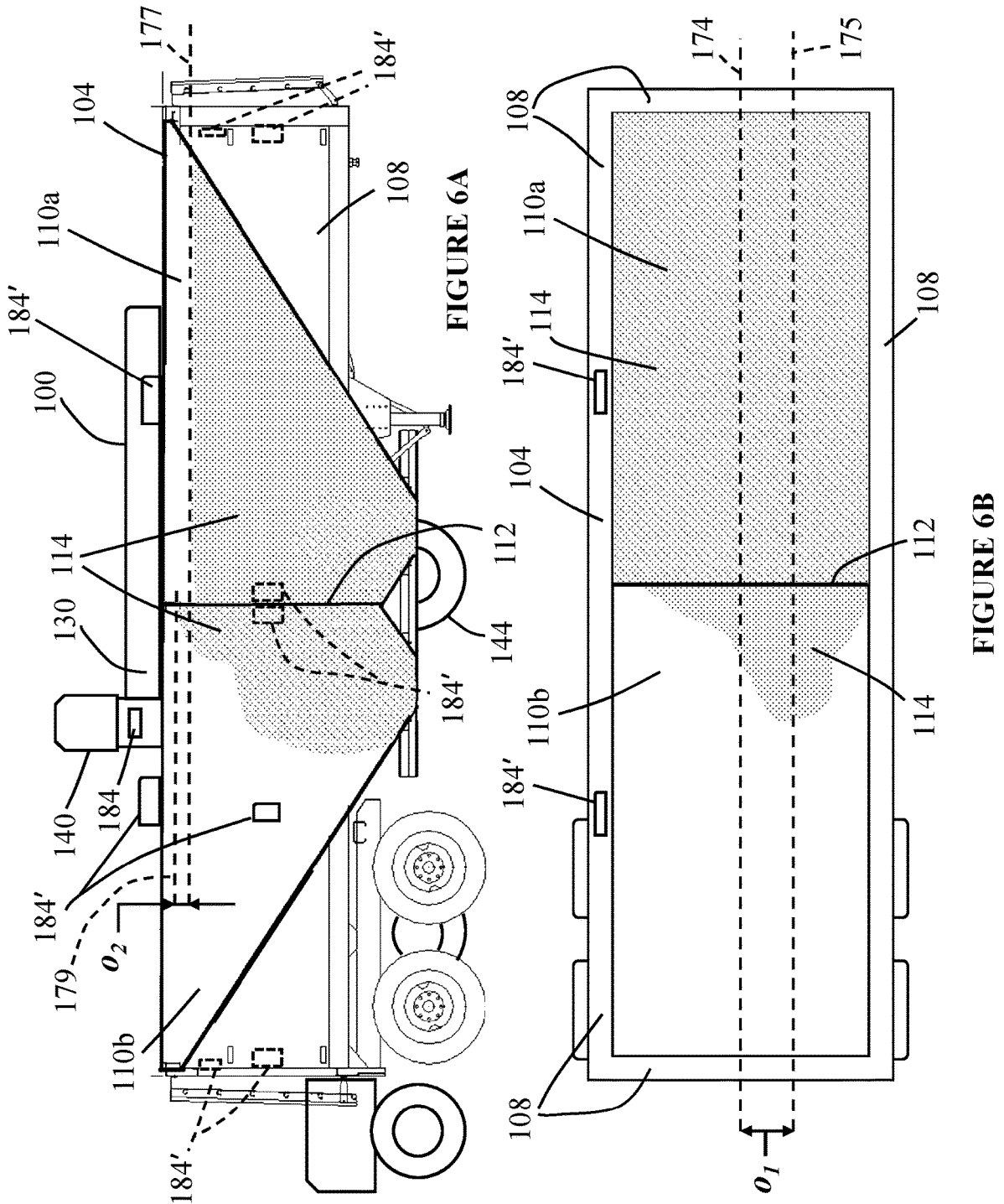
FIG. 6A illustrates a partial cutaway side view of an exemplary trailer in which harvested material has been generally uniformly deposited into a first storage compartment and is being unevenly spread or accumulated in a second storage compartment.
FIG. 6B illustrates a top view of the harvested material in the storage compartments of the exemplary trailer shown in FIG. 6A.

Additionally, or alternatively, as seen in at least FIGS. 5 and 6A, one or more of the auxiliary units 222 can be mounted to, or otherwise be part of, the trailer 104. Thus, for example, one or more auxiliary units 222 can be positioned on, or in, one or more sidewalls 108 and/or partition walls 112 of the trailer 104. As seen in FIG. 5, according to certain embodiments, an auxiliary unit 222 can be coupled to an upper portion of one or more sidewalls 108 of the trailer 104 above the storage compartments 110*a-b*, while FIG. 6A illustrates one or more sensors 184 positioned on an inner side of the sidewalls 108 and/or partition wall 112, among other locations within the storage compartments 110*a-b*.

According to certain embodiments, the automated grain cart unloading system 200 can include a central system 220 having a controller 244, at least one processor 246, a memory device 248, and a communication device 250 that can be similar to the corresponding devices discussed above. Additionally, the central system 220 can be configured to provide a machine-learning neural network 220 of an AI engine 222 that can assist in the identification and/or prediction of characteristics pertaining to the distribution and spreading of harvested material 114 from images or information obtained by the sensors 184, 184'. Moreover, evaluation of information captured by the sensor 184, 184' by the controller 202, 226 can, according to certain embodiments, be based at least in part on information stored or programmed in the controller 202, 226, including the memory device 206, 248, that was derived by an AI engine 222 of the central system 220 or other portion of the automated grain cart unloading system 200. Such an AI engine 222 can include, for example, models or algorithms developed by a training or machine learning of the neural network 220 of the AI engine 222, including via use of historical information that may be maintained in one or more databases 252 of the central system 220.

According to certain embodiments, once the information derived by the AI engine 222 is programmed or otherwise stored as part of the memory device 206, or other component of the automated grain cart unloading system 200, subsequently derived information, updates to information, algorithms, or models by the AI engine 222, including developed in association with machine learning by the neural network 220, may, or may not, be communicated to the other portions of the system 200, such as, for example, via a software update.

Figure 7:
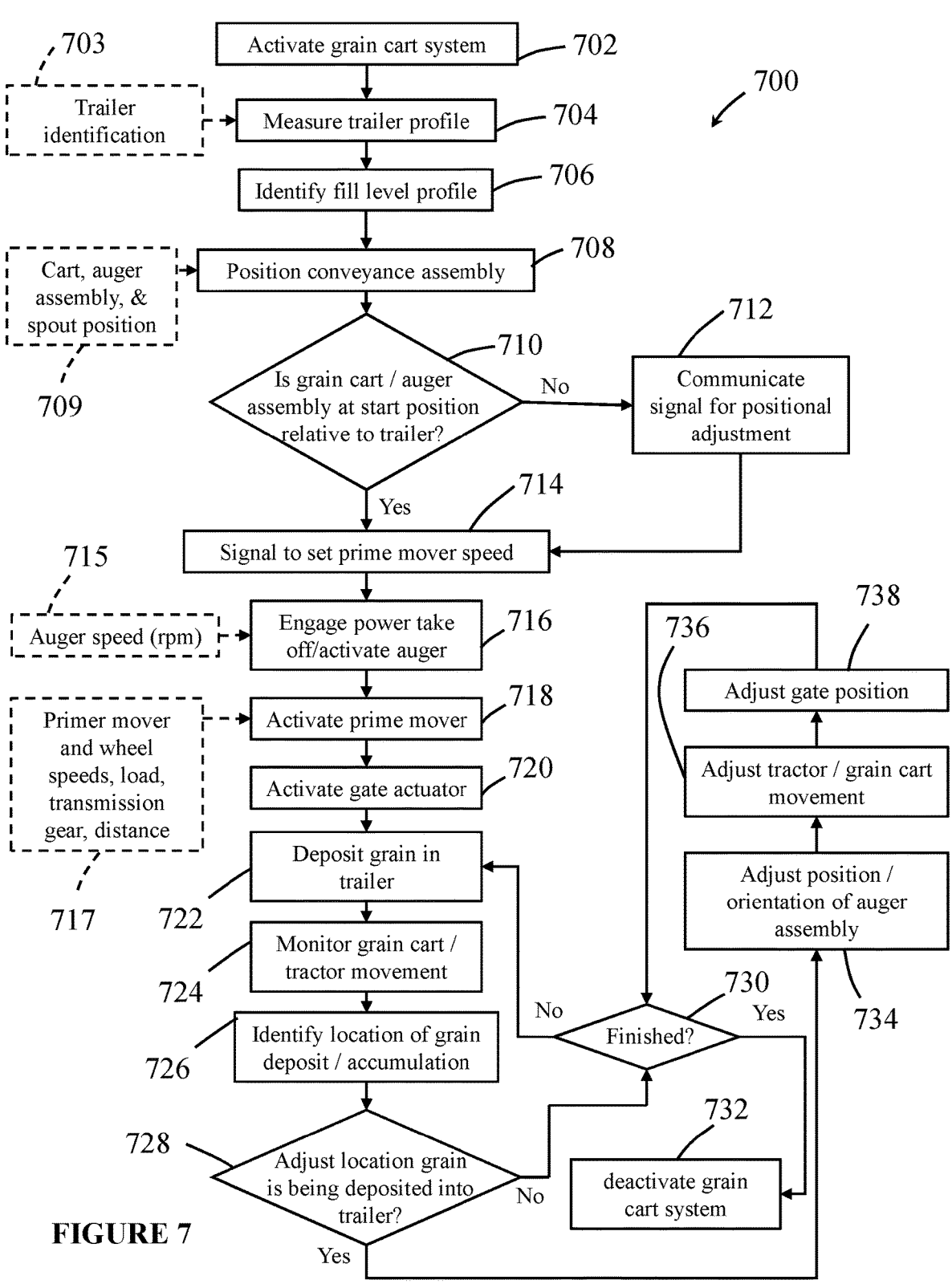
FIG. 7 illustrates a simplified flow diagram of an exemplary method for operating the illustrated automated grain cart unloading system.

FIG. 7 illustrates a simplified flow diagram of an exemplary method 700 for operating the illustrated automated grain cart unloading system 200. The method 700 is described below in the context of being carried out by the illustrated exemplary automated grain cart unloading system 200. However, it should be appreciated that method 700 may likewise be carried out by any of the other described implementations, as well as variations thereof. Further, the method 700 corresponds to, or is otherwise associated with, performance of the blocks described below in the illustrative sequence of FIG. 7. It should be appreciated, however, that the method 700 can be performed in one or more sequences different from the illustrative sequence. Additionally, while certain aspects to the method 700 may be described below with respect to the controller 202 of the grain cart 100, such features can additionally, or alternatively, be performed by other controllers of the system 200, including, but not limited to the controller 226, 244 of the towing machine 102 or central system 220, among other controllers.

At block 702 the operator can utilize the I/O device 238 to initiate activation of the automated grain cart unloading system 200. For example, by engaging the I/O device 238, a signal from the I/O device 238 can be received by the controller 202, 244 indicating an activation of the operation for automatic unloading of harvested material from the grain cart 100. At block 704, a profile of the trailer 104, and moreover, of one or more storage compartments 110*a-d* of the trailer 104, can be obtained. For example, according to certain embodiments, the profile of the storage compartment 110*a-d* based on one or more measurements, such as, for example, via information provided to, or derive by, the controller 202, 244 from one or more images obtained by the sensor 184. Additionally, or alternatively, as indicated by input block 703, the controller 202, 244 can receive, via use of the communications device 208, trailer identification information, such as, for example, information relating to the sizes, measurements, and/or geometries of the storage compartment(s) 110*a-d*, among other trailer 104 or storage compartment 110*a-d* information. For example, such information can include a vertical height, length, or width of the storage compartment(s) 110*a-d*. Such profile information can also provide, or be used to determine, the location of the central axis 174 of the storage compartment(s) 110*a-d*.

Additionally, such information provided at block 703 and/or determined at block 704 can identify, or be used to identify, the quantity of harvested material 114 that can be unloaded into the trailer 102 such that the trailer 102 is able to comply with weight requirements, including, but not limited to, weight requirements relating to travel along certain roads. Such information can also be based, at least in part, on current humidities and/or the moisture content of the harvested material 114. Knowledge of such weight requirements can assist the controller 202, 244 at block 706 in determining a predetermined fill profile for the harvested grain 114. The fill profile can include an indication of the quantity of the particular type of harvested material 114 that can be deposited into each storage compartment 110*a-d*, the rate at which harvested material 114 is to be unloaded into the storage compartment 110*a-d*, and/or the vertical height threshold for the pile or collection of harvested material 114 in the storage compartment 110*a-d* so as to prevent spillage, among other information. The fill profile can, according to certain embodiments, also be based on attaining a particular distribution profile of the harvested material 114 in the storage compartment 110*a-d*. For example, according to certain embodiments, the fill profile can be based on attaining a generally uniform distribution of harvested material 114 within the storage compartment(s) 110*a-d*. Additionally, or alternatively, the fill profile may be based in part on the harvested material 114 being distributed in the storage compartment(s) 110*a-d* so as to at least attempt to attain a particular weight distribution among at least the unloaded harvested material 114, alone or in combination with the weight distribution of the trailer 104.

Additionally, according to certain embodiments, information or determinations regarding the predetermined fill profile can be utilized by the controller 202, 244 to determine other aspects for the unloading of the harvested material 114, including, for example, the position of the gate 142 (e.g., the extent the gate 142 is to be opened), the speed at which the auger 150 is to be rotated, and/or the travel speed of the towing machine 102 and/or grain cart while unloading the harvested material, among other information. Thus, for example, at block 708, the controller 202, 244 can generate one or more signals to actuate one or more actuators 172, 176, 180, 228 of the actuator system 224 to position and/or orient at least the chute outlet 166 at a select position/orientation. For example, according to certain embodiments, at block 708, the actuator system 224 can be actuated such that the chute outlet 166 is position to be generally aligned with the central axis 174 of the storage compartment 110*a-d*. Which actuators 172, 176, 180, 228 are to be activated, and the extent or manner of activation, can be based on a variety of input information, as indicated by input block 709. For example, such input information can include one or more of a current position, and/or a selected position for, the conveyance housing 136, auger 150, chute 140, and/or chute outlet 166, among other components of the grain cart 100.

A block 710, a determination can be made by the controller 202, 244 as to whether the grain cart 100 and/or chute outlet 166 is at, or is approaching, a start position. Moreover, during an unloading operation at which harvested material 114 is unloaded, or transferred, from the grain cart 100 to the trailer 104, the trailer 104 is usually stationary. Thus, the grain cart 100 can, using the force provided by the prime mover 120 of the towing machine 102 or self-propelled grain cart 100, approach the trailer 104 so as to be positioned at a location at which the grain cart 100 can begin to travel alongside the trailer 104 so as to unload the harvested material 114 to the trailer 104, which can also be referred to as a start position. According to certain embodiments, upon reaching the start position, the sensors 184, 184' can be activated. Further, according to certain embodiments, upon activation, the sensors 184, 184' can be operated continuously, at certain time thresholds, and/or upon occurrence of one or more predetermined threshold events.

Accordingly, a block 710, a determination can be made as to whether the grain cart 100 is at, or is approaching, the start position. Whether the grain cart 100 is, or is not, at a start position, can be determined in a variety of manners, including, for example, via information provided by the sensor 184, 184' to the controller 202, 244. For example, the sensor 184 can provide one or more images that capture location indicia on a portion of the trailer 104 that the controller 202, 244 can use to determine the position of the grain cart 100 relative to the trailer 104, including distance between the grain cart 100 and the trailer 104 or start position, and/or the angular orientation of the grain cart 100 relative to the trailer 104 and/or start position. Such information can also indicate whether the chute 140 or chute opening 166 is positioned above a storage compartment 110*a-f*, which, according to certain embodiments, may be part of the determination of whether the grain cart is at the start position.

If the controller 202, 244 determines at block 710 that the grain cart 100 is not at the start position, then at block 712 the controller 202, 244 can generate a command for the prime mover 120 and/or steering system 224 to be operated in a manner that can move at least the grain cart 100 to the start position. Such a command can thus include the speed and/or direction at which the towing machine 102 and/or grain cart 100 is to be displaced so as to reach the start position.

Once at, or in anticipation of arriving at, the start position, the controller 202, 244 can generate one or more signals corresponding to at least an initial speed at which the prime mover 120 is to propel, and/or the steering system 224 is to direct, the towing machine 102 and/or grain cart 100. For example, according to certain embodiments in which the grain cart 100 is approaching the start position, the controller 202, 244 can issue a signal for the prime mover 120 to be operated in a manner that, upon arrival of the towing machine 102 and/or grain art 100 at the start position, reduces the speed of travel of at least the grain cart 100. Further, according to certain embodiments, the speed at which the controller 202, 244 is to indicate that the prime mover 120 is to be operated upon arrival of the grain cart 102 and/or towing machine 104 at the start position can be a speed that is below a predetermined threshold speed so as to enable the PTO to become engaged with the conveyance means, such as, for example, the auger 150, as indicated by block 716. Additionally, as indicated by input block 715, the controller 202, 244 can include instructions and/or receive input as to the speed at which the auger 150 is to be rotationally displaced.

At block 718, the controller 202, 244 can generate a signal to activate the prime mover 120 in a manner that propels at least the grain cart 100 in the forward direction 119 of travel. The signal generated at block 718 can be at least partially based on inputted information regarding wheel speed, prime mover 120 load, the transmission gear of the transmission that is to be engaged, and/or the distance at which the grain cart 100 is to be displaced, among other information, as generally indicated by input block 715. Additionally, at block 720, with the auger 150 actuated, the controller 202, 244 can automatically issue a signal to activate the gate actuator 228 so as displace the gate 142 to at least a partially open position. The extent to which the gate 142 is moved to the open position can be based on a variety of different criteria, including, for example, the anticipated flow rate of grain and the speed at which the grain cart 100 will travel so as to attain the fill profile as determined at block 706, among other information. With the gate 142 at an at least partially open position and the auger 150 rotating, the grain cart 100 can begin unloading harvested material 114 into a storage compartment 110*a-b* at block 722.

The operation of the activated automated grain cart unloading system 200 as harvested material 114 is being unloaded from the grain cart 100 can be monitored, such as, for example, by the controller 202, 244, at block 724. Such monitoring can include, for example, the extent the chute 140 or chute opening 166 is, or is not, aligned with the central longitudinal axis 174 of the storage compartments 110*a-b*, the quantity and/or rate at which harvested material 114 is being unloaded from the grain cart 100, the extent the grain cart 100 is moving towards or away from the adjacent trailer 104, and the speed of travel of the grain cart 100 and/or towing machine 102, among other information. Additionally, the controller 202, 244 can perform such monitoring using a variety of inputted information, including, for example, via use of information provided by, for derived from, the sensor 184, 184', flow sensor 188, auger sensor 152, speed sensor(s) 226, 234, and/or position sensor 182.

Using at least information provided by the images captured by the sensor 184, 184', at block 726 the controller 202, 244 can identify and/or predict the locations at which the unloaded harvested material 114 is settling/piling or being distributed in the storage compartment 110a-b. Moreover, at block 726 the controller 202, 244 can determine, using at least information captured the sensor 184, 184', whether the harvested material 114 is being distributed within the storage compartment 110a-b in a manner that complies, or will comply, with the fill profile determined at block 706, as previously discussed. For example, as illustrated in FIG. 6B, using information obtained from the sensor 184, 184', the controller 202, 244, can determine that the harvested material 114 being unloaded into a second storage compartment 110b is accumulating or forming a pile along a deposit center line 175 that is offset from the central axis 174 of the storage compartment 110a-b by a first offset distance ("o$_1$"). Additionally, in this example, controller 202, 244 can also determine from information provided by the sensor 184, 184' that the harvested material 114 shown in the first storage compartment 110a has accumulated to form a pile having a vertical height 177 that corresponds to the maximum height of the predetermined fill level profile as identified in block 706. However, using the same or other images obtained by the sensor 184, 184' the controller 202, 244 can also determine that the harvested material 114 being accumulated in the second storage compartment 110b has, or is forming, a pile have a vertical height 179 that exceeds the vertical height 177 of the fill profile by a second offset distance ("o$_2$").

Additionally, the controller 202, 244 can determine at block 728 whether at least certain weight related aspects of the fill profile identified at block 706 are, or are not, being attained by the harvested material 114 that has been, or is being, deposited into the storage compartment(s) 11a-d. Moreover, at block 728, the controller 202, 244 can determine whether the amount and/or the rate at which harvested material 114 is being unloaded into the storage compartment 110a-b is, or will, satisfy identified weight requirements for the harvested material 114 and/or trailer 104, as discussed above with respect to at least block 706.

The foregoing are merely examples of potential issues in the unloading of harvested material 114 that may be identified by the controller 202, 244 via use of the captured information from the sensor 184, 184'. Moreover, the controller 202, 244 can use at least information provided by, or derived from, the images attained by the operation of the sensors 148, 148' to identify a variety of other issues with respect to the location and shape harvested material 114 is being deposited or is settling/piling in the storage compartment 110a-b.

Thus, from the information provided by at least block 726, the controller 202, 244 can, at block 728, determine whether to adjust, and the extent of adjustment, of one or more settings, positions and/or orientations of one or more components of the system 200. For example, at block 726, the controller 202, 244 can determine whether to adjust a setting, position, and/or orientation of the conveyance assembly 134, gate 142, and/or conveyance means (e.g., auger 150), as well as determine whether to adjust the speed and/or direction of travel of the grain cart 100 or towing machine 102, among other adjustments associated with the unloading of the harvested material 114. If the controller 202, 244 determines at block 728 that adjustments are not to be made, then the controller 202, 244 can determine at block 730 whether the unloading operation has concluded.

A determination by the controller 202, 244 at block 730 as to whether the unloading operation has concluded can include determining whether the unloading of harvested material 114 into a particular storage compartment 110a-b, or all of the storage compartments 110a-b, is complete. For example, while a determination can be that unloading into a particular storage compartment 110a-b is complete, the controller 202, 244 can also determine that another storage compartment 110a-b is not full. If another storage compartment 110a-b is not full, then at block 730 the controller 202, 244 can issue one or more commands for the propulsion system 118 that be used to move at least the grain cart 100 to a location at which harvested material 114 can be unloaded to the not-yet full storage compartment 110a-d. Such commands can include indications of the maximum acceleration or deceleration, speed, distance to travel, and distance tolerances for movement or travel of the towing machine 102 and/or grain cart 100 to a position at which the grain cart 100 can unload harvested material 114 into the not-yet full storage compartment 110a-d.

Conversely, if a determination is made at block 730 that the unloading operation is finished or complete (e.g., no other harvested material 114 is be unloaded into any storage compartment(s) 110a-b), then the unloading operation can be deactivated at block 732. Such deactivation can include activating the gate actuator 228 to displace the gate 142 to the close position, decoupling the conveyance means from the PTO, and/or propelling the grain cart 100 to a pre-designated location away from the trailer 104. Additionally, upon, or prior to, completion of the unloading operation, information regarding the settings of various components of the automated grain cart unloading system 200, including regarding the speed of travel of the grain cart 100, position of the gate 142, speed of the auger 150, and/or positions of the conveyance assembly 134, among other information, can be stored in the memory device 206, 248 and/or communicated to the central system 220 for possible future use or reference. Additionally, according to certain embodiments, images obtained by the sensor(s) 184, 184' and/or information derived therefrom can be communicated to the database 252 for use with machine learning by the neural network 220 of the AI engine 222. Otherwise, if the unloading operation is to continue, then at least blocks 722, 724, 726, and 728 can be to be repeated until the unloading operation has concluded.

If, however, at block 728 the controller 202, 244 determines at least some adjustments are to be made in the unloading operation, the controller 202, 244 can determine which adjustments are, or are not, to be made, as well as the particular details of such adjustments. Such a determination by the controller 202, 244 can further include determining how an adjustment to one aspect of the operation or settings of the unloading operation can impact at least another operation, and whether that other operation is thus also to be adjusted. For example, when adjusting the speed at which the auger 150 is rotated, the controller 202, 244 can also determine whether a corresponding change is, or is not, to be made to either or both the position of the gate 142 and the speed of travel of at least the grain cart 100 such that weight related thresholds of the fill profile from block 796 are satisfied or maintained. If an adjustment(s) is/are to be made, the controller 202, 244 can issue one or more commands so as to facilitate those adjustments occurring.

Thus, for example, at block 734, the controller 202, 244 may determine to, or not to, activate one or more components of the actuator system 224 to adjust a position of the conveyance assembly 134, including adjusting an angular and/or linear orientation of one or more of the chute, chute outlet, and/or convenience housing, among other components of the conveyance assembly 134. Such adjustments can be attained in a variety of manners. For example, with respect to certain embodiments, such linear adjustments can be associated with a change in position of the grain cart 100, including, for example, a linear change associated with, or in a direction that, the grain cart 100 is traveling, including, for example, being pushed or pulled by the towing machine 102. However, according to other embodiments, such linear adjustments can be in a direction that is different than a direction at the grain cart 100 is traveling. Additionally, at block 734, the controller 202, 244 can determine whether to adjust the speed at which the convenience means is being operated. For example, the controller 202, 244 can determine whether to increase or reduce the speed at which the auger 150 is being rotated so as to adjust the rate at which harvested material 114 is being outputted from the chute outlet 166. Again, such adjustment in the speed of rotation of the auger 150 can, for example, impact at least the quantity, and thus weight, of the harvested material 114 that is being deposited into the storage compartment 110a-b and/or trailer 104.

Additionally, or alternatively, the controller 202, 244 can at block 736 determine to adjust a location or position, speed and/or direction of travel of the towing machine 102 and/or grain cart 100. For example, according to certain embodiments, the controller 202, 244 can determine to issue one or more signals utilized for the propulsion system 118, and moreover, the prime mover 120, to move, if not already moving, the towing machine 102 and/or grain cart for a current position, or increase or reduce a speed of the towing machine 102 and/or grain cart 100.

The controller 202, 244 can also issue a command to change the gear being utilized by the transmission system in the movement of the towing machine 102 and/or grain cart 100. For example, the controller 202, 244 can issue a command that facilitates the transmission being shifted to a gear that changes a speed or a direction of travel including, for example, changes the towing machine 102 and/or grain cart 100 from traveling in a forward direction to traveling in a reverse direction, and vice versa. The controller 202, 244 can also indicate the duration of time and/or speed at which the towing machine 102 and/or grain cart 100 is to travel in one direction before resuming with travel in another, opposite direction. Alternatively, the controller 202, 244 can continue to monitor information provided by the sensor 184, 184' in connection with determining when the towing machine 102 and/or grain cart 100 is/are to change from traveling in one direction to traveling in another direction. The controller 202, 244 can also issue one or more commands at block 736 for the steering system 224 to adjust the angular direction at which the towing machine 102 and/or grain cart 100 is moving relative to at least the trailer 104 and/or the central axis 174 of the storage compartments 110a-d.

Additionally, or alternatively, at block 738 the controller 202, 244 can determine whether to adjust the position of the gate 142. Again, such an adjustment can correspond to the gate 142 being displaced to the open position, or at a location between the fully open and close positions. According to the illustrated embodiment, if the gate 142 position is to be changed, the controller 202, 244 can generate a signal that activates the gate actuator 228 so as to displace the position of the gate 142.

The above-mentioned exemplary adjustments from blocks 734, 736, and 738 can occur while the grain cart 100 continues to unload harvested material 114 into the trailer 104 at block 722. Thus the process of unloading harvested material 114 and making adjustments, if any, to the unloading operation can continue until a determination is made by the controller 202, 244 at block 728 that no adjustments are warranted, and/or a determination at block 730 that the unloading operation is finished, in which event the unloading operation can be deactivated at block 732, as discussed above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An apparatus for unloading a harvested material to a storage compartment, the apparatus comprising:
   a plurality of sidewalls that at least partially define an inner area, the inner area configured to house the harvested material;
   a conveyance assembly comprising a base portion, a conveyance means, and a chute;
   a gate configured to control a passage of the harvested material from the inner area to the base portion, the conveyance means configured to convey the harvested material from the base portion to the chute, the chute configured to release at least a portion of harvested material into the storage compartment;
   an optical sensor configured to capture, repeatedly during the unloading operation, a sequence of images of a distribution of the harvested material as the harvested material accumulates in the storage compartment;
   at least one processor; and
   a memory device coupled with the at least one processor, the memory device including instructions that when executed by the at least one processor cause the at least one processor to:
      generate, from the images of the distribution of the harvested material, a current fill profile;
      identify a predetermined fill profile, the predetermined fill profile corresponding to at least one of a location or a height of one or more piles of harvested material that are to be formed within the storage compartment from the harvested material released from the chute;
      determine a deviation between the predetermined fill profile and the current fill profile; and
      generate, based at least on the deviation, an adjustment signal to adjust at least one of (1) the position of the gate to regulate a flow rate of harvested material, (2) a position or an orientation of the conveyance assembly or the chute, and (3) a speed or a location of the apparatus relative to the storage compartment, wherein the at least one adjustment is selected to minimize the deviation as harvested material is being deposited into the storage compartment.

2. The apparatus of claim 1, wherein the conveyance means is an auger, and wherein the apparatus is a mobile apparatus having a plurality of engagement bodies to contact a ground surface, and wherein the apparatus further includes one or more position sensors positioned and configured to sense at least one of a gate position of the gate, an auger position for the auger, and a chute position for the chute.

3. The apparatus of claim 2, wherein the apparatus includes or is coupled to a prime mover that provides a propulsion force for a displacement of the apparatus along the ground surface, and wherein the memory device includes instructions that when executed by the at least one processor further cause the at least one processor to, based on the deviation, generate a command that adjusts an operation of the prime mover that adjusts a speed of the displacement of the apparatus.

4. The apparatus of claim 3, wherein the memory device includes instructions that when executed by the at least one processor further cause the at least one processor to, based on of the deviation, generate a command that adjusts a direction of the displacement of the apparatus.

5. The apparatus of claim 3, wherein the fill profile indicates a weight for the one or more piles of harvested material that are to be formed within the storage compartment, and wherein the memory device includes instructions that when executed by the at least one processor further cause the at least one processor to determine at least one of the speed of the displacement of the apparatus, and a speed at which the auger is to be rotated for the one or more piles of harvested material to attain the weight.

6. The apparatus of claim 2, wherein the memory device includes instructions that when executed by the at least one processor further cause the at least one processor to, based on the deviation, generate a command that adjusts a speed at which the auger is rotated.

7. The apparatus of claim 2, wherein the sensor is coupled to a conveyance housing of the conveyance assembly, the conveyance housing defining an interior passageway that houses at least a portion of the auger.

8. The apparatus of claim 1, wherein the memory device includes instructions that when executed by the at least one processor further cause the at least one processor to measure a size of the storage compartment from at least the captured information provided by the sensor, and wherein the fill profile is based at least in part on the size.

9. The apparatus of claim 1, wherein the memory device includes instructions that when executed by the at least one processor further cause the at least one processor to determine whether the apparatus is at a start position.

10. The apparatus of claim 1, wherein the memory device includes instructions that when executed by the at least one processor further cause the at least one processor to generate a signal to displace the conveyance assembly to change a position of the chute relative to a longitudinal center line of the storage compartment.

11. The apparatus of claim 1, wherein the memory device includes instructions that when executed by the at least one processor further cause the at least one processor to:

determine, using at least the fill profile, when to displace the gate to a close position at which the gate prevents passage of the harvested material from the inner area to the base portion; and generate a signal to facilitate a recording of a position of at least one of the gate or the conveyance assembly at least when the gate was moved to the closed position.

12. The apparatus of claim 11, further including a neural network and a database, wherein the captured information obtained by the sensor and the position of at least one of the gate or the conveyance assembly at least when the gate was moved to the closed position are recorded as a training data in the database, and wherein the neural network is configured to analyze, for continuous training of the neural network based on machine learning, the training data to improve an accuracy of the adjustment signal generated by the at least one processor.

13. A method for unloading a harvested material to a storage compartment, the method comprising:

displacing, by a gate actuator, a gate from a closed position to an at least partially open position;

conveying the harvested material that passed by the gate along a conveyance means to a chute of a conveyance assembly, the chute being configured to deposit at least a portion of the harvested material into the storage compartment;

capturing, repeatedly during the unloading operation, by an optical sensor associated with conveyance assembly, a sequence of images of a distribution of the harvested material as the harvested material accumulates in the storage compartment;

generating, from the images of the distribution of the harvested material, a current fill profile;

identifying a predetermined fill profile corresponding to at least one of a location or a height of one or more piles of harvested material that are to be formed within the storage compartment from the harvested material deposited into the storage compartment;

determining a deviation between the predetermined fill profile and the current fill profile;

generating, based at least on the deviation, an adjustment signal; and adjusting, in response to the adjustment signal, at least one of (1) the position of the gate to regulate a flow rate of harvested material, (2) a position or an orientation of the conveyance assembly or the chute, and (3) a speed or a location of the apparatus relative to the storage compartment, wherein the at least one adjustment is selected to minimize the deviation as harvested material is being deposited into the storage compartment.

14. The method of claim 13, wherein the conveyance means is an auger.

15. The method of claim 14, further including adjusting, based on the deviation, a speed at which at least the chute travels relative to the storage compartment.

16. The method of claim 14, further including adjusting, based on the deviation, a direction at which at least the chute travels relative to the storage compartment.

17. The method of claim 14, wherein identifying the fill profile comprises determining a weight for the one or more piles of harvested material, and wherein the method further comprises:

determining at least one of a speed of a displacement of at least the chute relative to the storage compartment, and/or a speed at which the auger is to be rotated for the one or more piles of harvested material to attain the weight.

18. The method of claim 13, wherein identifying the fill profile comprises measuring a size of the storage compartment from at least the captured information provided by the optical sensor, and wherein the predetermined fill profile is based at least in part on the size.

19. The method of claim 13, further including:

displacing the conveyance assembly to change a position of the chute relative to a longitudinal center line of the storage compartment.

20. The method of claim 13, further including:

determining, using at least the fill profile, when to displace the gate to a close position at which the gate is positioned to prevent passage of the harvested material to the conveyance assembly; and generating, after the gate is at the closed position, a signal to facilitate a recording a position of at least one of the gate or the conveyance assembly.

\* \* \* \* \*